(12) United States Patent
Greninger

(10) Patent No.: US 6,437,321 B1
(45) Date of Patent: Aug. 20, 2002

(54) METHOD AND APPARATUS TO CORRECT FOR THERMALLY-INDUCED WAVEFRONT DISTORTION IN CRYSTAL RODS

(75) Inventor: Charles E. Greninger, West Hills, CA (US)

(73) Assignee: The Boeing Company, Chicago, IL (US)

(*) Notice: Subject to any disclaimer, the term of this patent is extended or adjusted under 35 U.S.C. 154(b) by 55 days.

(21) Appl. No.: 09/590,526

(22) Filed: Jun. 8, 2000

(51) Int. Cl.[7] .................................................. G01J 1/04
(52) U.S. Cl. .................... 250/227.14; 250/216; 356/521
(58) Field of Search ........................... 250/201.1, 201.9, 250/227.14, 227.17; 356/521; 359/290, 291, 238, 285; 340/555

(56) References Cited

U.S. PATENT DOCUMENTS

| | | | |
|---|---|---|---|
| 3,923,400 A | * 12/1975 | Hardy | 356/521 |
| 4,342,907 A | * 8/1982 | Macedo et al. | 250/227.14 |
| 4,472,029 A | 9/1984 | Hardy | |
| 4,929,830 A | * 5/1990 | Bohnert et al. | 250/227.14 |
| 5,159,474 A | 10/1992 | Franke et al. | |
| 5,229,889 A | 7/1993 | Kittell | |
| 5,341,236 A | 8/1994 | Stappaerts | |
| 5,466,935 A | * 11/1995 | Ray et al. | 250/307 |
| 6,043,940 A | * 3/2000 | Kamiyama et al. | 359/719 |

* cited by examiner

*Primary Examiner*—Robert H. Kim
*Assistant Examiner*—Chih-Cheng Glen Kao
(74) *Attorney, Agent, or Firm*—Harness Dickey & Pierce P.L.C.

(57) ABSTRACT

An optical correction system for correcting thermally-induced wavefront distortions in an optical signal emanating from a crystal or other form of optical device/system. An optical output signal from the thermally sensitive optical device/system is fed to a beamsplitter, which produces a reflected optical signal and a refracted optical signal containing thermally-induced distortion. The refracted signal is fed to a wavefront distortion sensor which produces an output signal representative of the thermally-induced distortion. The output of the wavefront distortion sensor is fed to a computational device which determines the necessary degree of error correction to compensate for the thermally-induced optical distortion. A stress application device receives the output of the computational device and generates an electrical signal in accordance therewith which is then used to control a force applicator in physical contact with the crystal. The force applicator applies a precise degree of stress (either tensile or compressive) to the crystal to remove or substantially reduce the thermally-induced optical distortion.

14 Claims, 2 Drawing Sheets

METHOD AND APPARATUS TO CORRECT FOR THERMALLY-INDUCED WAVEFRONT DISTORTION IN CRYSTAL RODS

TECHNICAL FIELD

The present invention relates generally to an optical system for correcting thermally-induced wavefront distortion in a crystal, and more particularly to a variable applied stress device used with a crystal to correct for optical distortion in the crystal caused by thermal factors.

BACKGROUND OF THE INVENTION

An optical system in which a crystal is utilized to generate a laser beam for experimentation and measurement should transmit a beam that is free of optical distortions. The crystal is usually a long rod used to generate a moderate power laser beam or may comprise an electro-optical or nonlinear optical element to modify the beam. The optical effects generated in a crystal due to heating from a high power or moderate power laser beam occur even though the beam is expected to provide good beam quality and high polarization purity after passing through the crystal. However, optical distortion and birefringence result from a perfectly linearly polarized moderate power laser beam through a heated crystal rod. The correction of the optical wavefront distortion and birefringence is sought if thermally induced. Distortion and birefringence depend on the temperature variation within the crystal generated by the absorption of the laser beam. The heating of the crystal produces thermal-stress-strain effects. The thermal-stress-strain effects distort the output beam from the crystal.

Systems and methods to correct wavefront distortion and birefringence currently employ multiple actuator deformable mirrors, which are very expensive and cumbersome. Numerous actuator signals must be produced and transmitted to each actuator and the interactions between the various actuators and their various signals must be overcome. A system and method is therefore desired which will decrease the number of signals and complexity associated with employing multiple actuator deformable mirrors.

SUMMARY OF THE INVENTION

The above and other objects are provided by an optical correction system and method in accordance with the preferred embodiments of the present invention. In one preferred embodiment, the optical correction system includes a stress application device that applies a stress to a crystal to minimize optical distortions created in a transmitted beam. The stress application device is coupled to a computational device that determines the optical distortion of the transmitted beam. A beam sensor and wavefront reconstructor is coupled to the computational device and provides a measurement of the transmitted beam. The beam sensor and wavefront reconstructor receives a refracted beam from a beamsplitter that divides the transmitted beam into a reflected beam and the refracted beam. The reflected beam, which originally includes a degree of optical distortion, is corrected via the application of a precise degree of stress to the crystal.

The system and method of the present invention thus forms an effective "closed-loop" system by which the optical distortion resulting from thermal factors experienced by the crystal can be continuously monitored, in real time, and precisely corrected.

The optical correction system and method of the present invention also does not add significantly to the overall cost of the optical system. It further does not add to the complexity of the optical system, does not require the production and transmission of signals, and can be used with a variety of crystal geometries.

BRIEF DESCRIPTION OF THE DRAWINGS

The various advantages of the present invention will become apparent to one skilled in the art by reading the following specification and subjoined claims and by referencing the drawings in which:

DETAILED DESCRIPTION OF THE PREFERRED EMBODIMENTS

Figure 1:
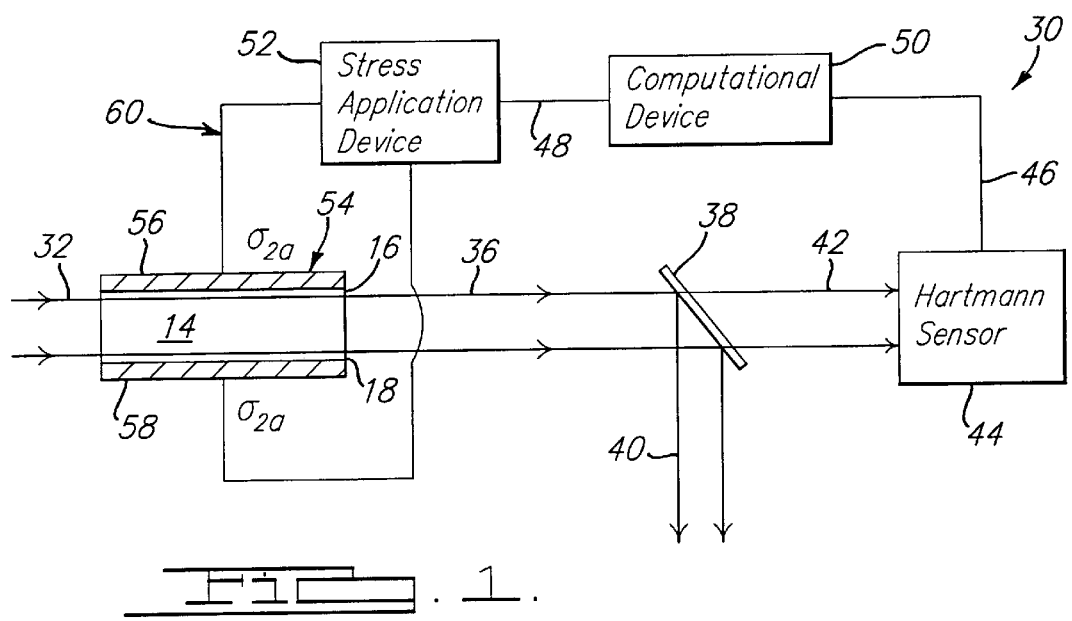
FIG. 1 is a simplified block diagram showing one preferred embodiment of the apparatus of the present invention.

FIG. 1 shows an optical correction system generally depicted at 30. The system 30 is used for correcting, in real time, the wavefront distortion imparted to an optical beam output from a crystal 14 as a result of thermal factors acting on the crystal 14. However, it should be appreciated that the system 30 can correct output from an anisotropic crystal, any laser beam generating device or the laser. The system 30 generally comprises a beam splitter 38, a wavefront sensor 44, a computational device 50 for determining the necessary degree of correction needed to be applied to the crystal, and a stress applicator device 52.

In operation, an aberrated or input beam 32 is incident upon the crystal 14. The input beam 32 can be generated by a variety of means including, but not limited to, an optical device such as a laser and any laser beam generating device, or directly from another crystal. In the preferred embodiment, the crystal 14 produces a transmitted beam or output beam 36 that is incident upon beamsplitter 38. The beamsplitter 38 divides the output beam 36 into a refracted beam 42 and a reflected or corrected beam 40. Beamsplitter 38 is sufficiently thin so that it does not introduce optical distortions. The corrected beam 40 is reflected by beamsplitter 38 and used for experimentation and measurement. The refracted beam 42 is transmitted by beamsplitter 38 to the wavefront sensor 44. One preferred form of the wavefront sensor 44 comprises a Hartmann sensor, although it will be appreciated that other forms of sensors could also be employed.

The wavefront sensor 44 detects the slope of the wavefront at several locations across the refracted beam 42 and produces a measured signal 46 related to the refracted beam 42 which is representative of the optical distortion in the output beam 36. The measured signal 46 produced by the wavefront sensor 44 is transmitted to the computational device 50. The computational device 50 essentially determines the degree of error correction needed to remove the wavefront distortion in the refracted beam 42 and generates an appropriate actuator signal 48 which is transmitted to a stress application device 52. The actuator signal 48 is such that the optical distortion of sampled beam 42 and reflected beam 40 are minimized or eliminated.

The computational device 50 determines a minimized optical distortion preferably via a least squares method which is well known in the art. The least squares method is applied to the optical distortion. In the preferred embodiment, computational device 50 also determines the root means square of the optical distortion which is used in the least squares method. The optical distortion due to thermal-stress-strain effects in a rectangular rod shaped crystal with light propagating along its optical axis is given by the equation:

$$\Phi = kl \left\{ \frac{\partial n_o}{\partial T} T - \frac{n_o^3}{4} [(q_{11} + q_{12})(\sigma_1 + \sigma_2) + 2q_{13}\sigma_3 + (q_{11} + q_{12})(\sigma_{1a} + \sigma_{2a})] \right\}$$

Equation 1.

where "k" is the wave number; "l" is the thickness of the rod; "$\partial n_o/\partial T$" is the variation of the ordinary refractive index with respect to temperature; "T" is the transverse temperature variation in the rod; "$n_o$" is the refractive index of the ordinary wave in the absence of temperature rise and stress; "$q_{11}$," "$q_{12}$" and "$q_{13}$" are stress photoelastic constants; "$\sigma_1$," "$\sigma_2$" and "$\sigma_3$" are the thermally induced stresses in the X, Y and Z directions, respectively, and "$\sigma_{1a}$," and "$\sigma_{2a}$" are the applied stresses.

The thermal-stress-strain optical distortion effects in a cylindrical shaped rod trigonal crystal with light propagating along its optic axis is given by the following equation where k, l, $\partial n_o/\partial T$, T and $n_o$ are as described above for Equation 1:

$$\Phi = kl \left\{ \frac{\partial n_o}{\partial T} T - \frac{n_o^3 [(q_{11} + q_{12})(\sigma_r + \sigma_\theta) + 2q_{13}\sigma_3 + (q_{11} + q_{12})\sigma_{ra}]}{(4)} \right\}$$

Equation 2.

Here, "$\sigma_r$," "$\sigma_\theta$" and "$\sigma_3$" are radial, hoop and longitudinal stresses, respectively, that are generated by the thermal distribution; "$\sigma_{ra}$" is an applied stress which is applied uniformly along the rod; and "$q_{11}$," "$q_{12}$" and "$q_{13}$" are stress photoelastic constants of the material. The optical distortion expression for a cylindrical crystal having a round cross-section and a symmetry structure simpler than trigonal will have a similar but simpler form of Equation 2.

With continued reference to FIG. 1, the stress application device 52, by way of example, may comprise a piezoelectric transducer. In the preferred embodiment, the stress application device 52 is coupled between the computation device 50 and a force applicator 54, and provides an electric stress signal 60 to the force applicator 54. The force applicator 54 is preferably U-shaped and has plates 56, 58. However, it should be appreciated that additional force applicators can have more than two plates for applying forces to the crystal. Moreover, if the crystal is cylindrical, then the force applicator 54 is substantially cylindrically shaped and sized to fit the length of the crystal 14. In the preferred embodiment, first plate 56 and second plate 58 are movably juxtaposed to the lateral faces 16, 18, respectively, of crystal 14. However, the plates 56,58 can be fixed to the crystal 14 if, for example, an application of tensile stress to the crystal is desired. The plates 56, 58 apply a controlled compressive or tensile stress to the lateral faces 16, 18, which can be varied in magnitude depending on the stress signal 60 produced by computational device 50. The first plate 56 and second plate 58 preferably provide a uniform application of stress across the lateral surfaces 16, 18 of crystal 14, and therefore minimize the thermally-induced optical distortion related to temperature variations.

Figure 2A:
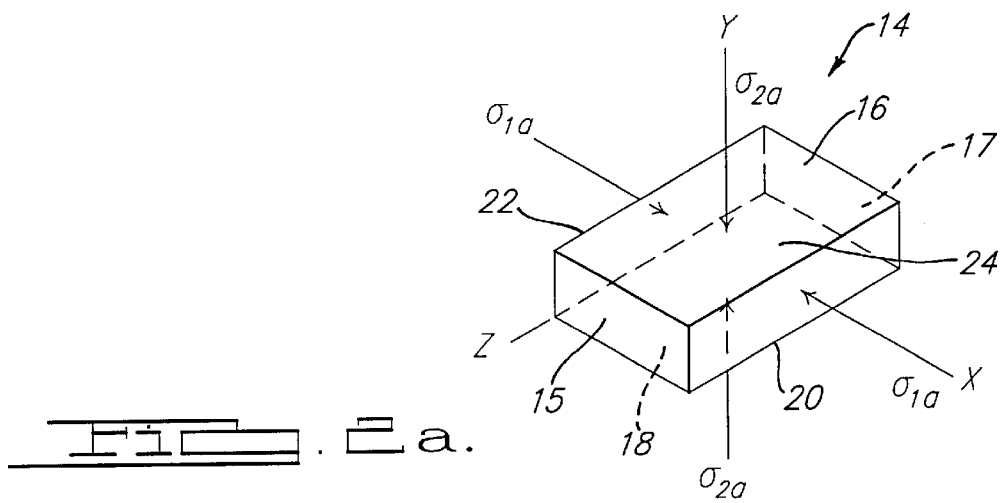
FIG. 2(a) is a front perspective view showing a rectangular shaped crystal which may be used with the optical correction system of the present invention.

FIG. 2(a) shows a first preferred embodiment of the crystal 14 of the present invention. In this preferred embodiment, the crystal 14 has a geometry of a long, rectangular crystal rod and has two pairs of lateral faces 16,18 and 20,22 transverse to the X-axis and Y-axis, respectively. The crystal 14 also has a first end 15 and a second end 17. Crystal 14 has a trigonal symmetry; however, it should be appreciated that crystals with simpler symmetry can be used including, but not limited to, cubic symmetry crystals such as a yttrium aluminum garnet (YAG), ruby, and isotropic symmetry class crystals. The crystal 14 preferably has a cross-section that is a substantially rectangular shape. In this embodiment, light propagates along the optic axis which is in the long direction normal to the ends 15, 17 of the crystal 14. The direction of propagation is in the −Z direction of a Cartesian coordinate system. The Cartesian coordinate system has the Z-axis parallel to the optic axis of the crystal 14. The X and Y axes are parallel to standard crystallographic axes for physical property representation. Thermally-induced normal stresses $\sigma_1$, $\sigma_2$ and $\sigma_3$ occur parallel to the X, Y and Z directions, respectively. In this embodiment, stresses $\sigma_{1a}$ and $\sigma_{2a}$ are compressive and applied to the lateral faces to minimize the optical distortion as the temperature changes occur. It should be appreciated that stresses applied are uniform along crystal 14.

Referring further to FIG. 2(a), in this embodiment, stresses $\sigma_{1a}$ and $\sigma_{2a}$ are applied to the pairs of lateral faces 20, 22, and 16, 18, respectively; however, it should be appreciated that stress can be applied to any or all of the lateral faces. The stresses applied can be either compressive or tensile. The stress applied is preferably compressive if crystal 14 has a greater temperature toward the crystal center 24, whereas the stress applied is preferably tensile if the crystal 14 has a lower temperature toward the crystal center 24, relative to the lateral faces 16, 18, 20 and 22. Heating of the crystal 14 is generally uniform in the direction parallel to the Z-axis. The crystal 14 utilized to transmit a laser beam typically has a greater temperature toward the crystal center.

Figure 2B:
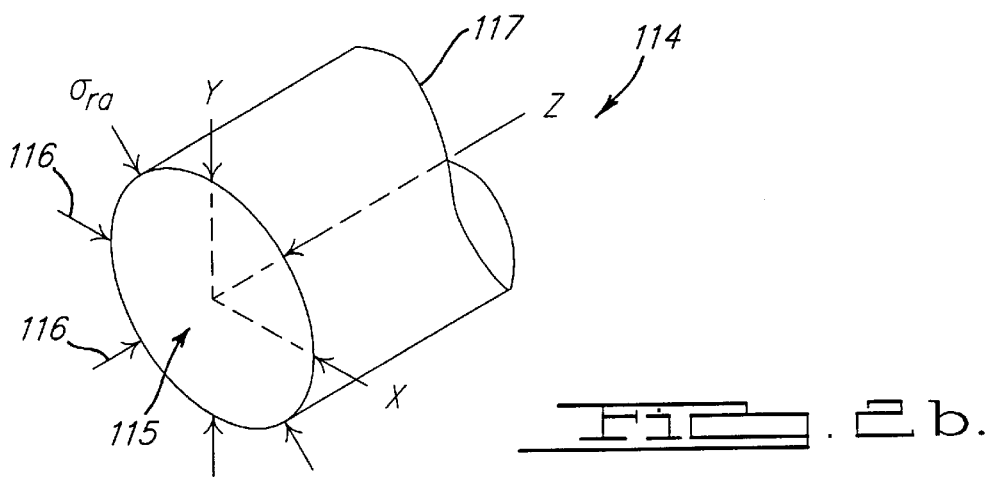
FIG. 2(b) is a front perspective view showing a cylindrical shaped crystal which may be used with the optical correction system of the present invention.

FIG. 2(b) shows a second preferred embodiment of a crystal 114 of the present invention. The crystal 114 is a cylindrical shaped crystal rod with a circular cross-section. In the preferred embodiment, light propagates along the optic axis that is in the long direction normal to the ends 115, 117 of crystal 114. In the preferred embodiment, the applied stresses $\sigma_{ra}$ are compressive and uniformly applied in the radial direction along the length of crystal 114, as indicated by arrows 116.

Figure 3:
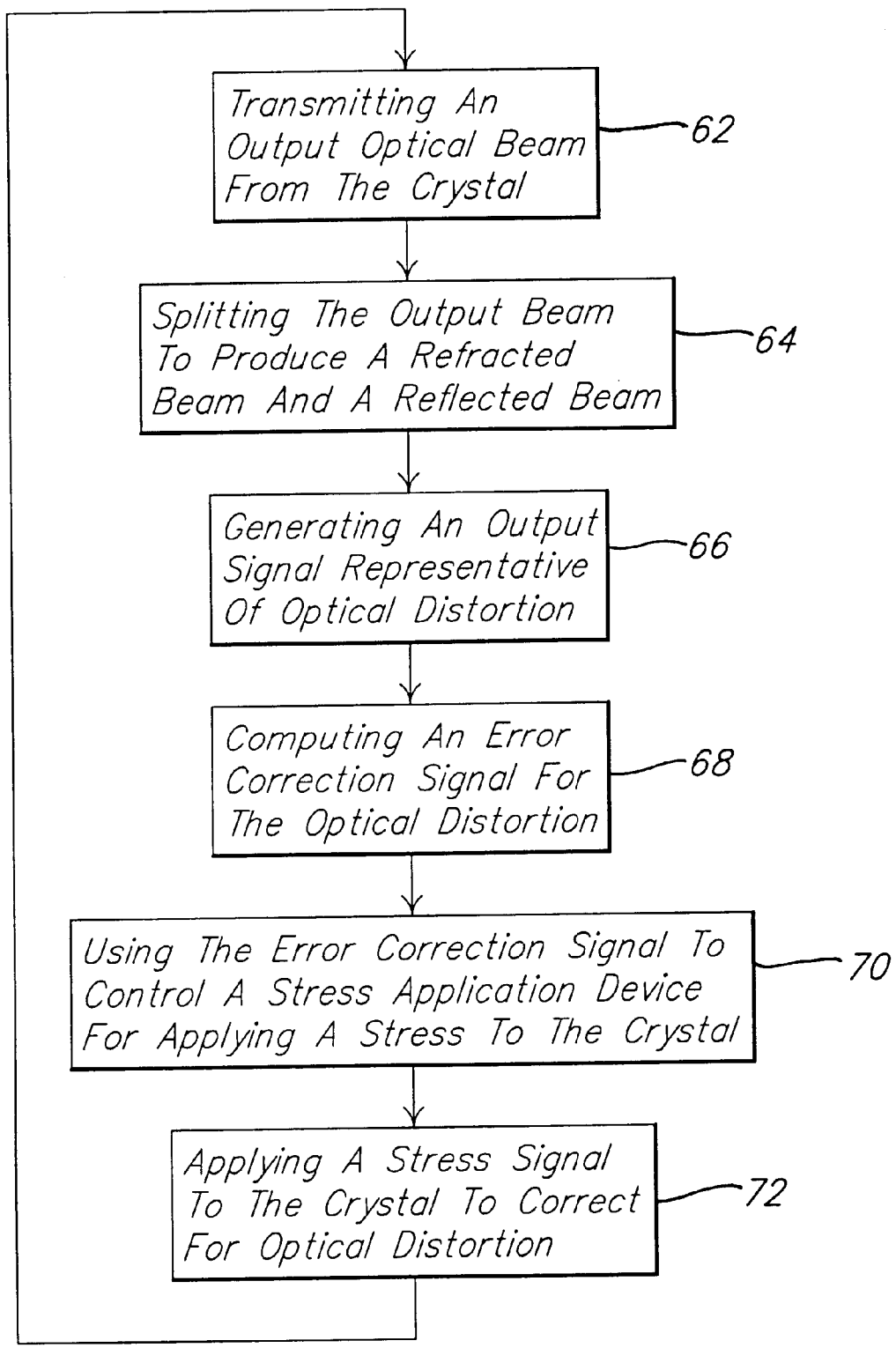
FIG. 3 is a flow diagram showing a preferred method in accordance with the present invention for minimizing optical distortions of the present invention.

FIG. 3 shows a simplified flow chart representing the steps performed in executing a preferred method of the present invention. Step 62 involves transmitting an output beam from the crystal 14. The output beam is then split into a refracted beam and a reflected beam, as indicated by block 64. The refracted beam 42 is then processed by the wavefront sensor 44 to produce an output signal having a component which is indicative of the degree of optical distortion in the optical signal leaving the crystal 14, as indicated in step 66.

Step 68 involves computing an error correction signal for substantially reducing or eliminating the optical distortion in the refracted beam 42.

Step 70 involves using the error correction signal to control the stress application device 52, which generates signals specifically adapted to compensate for the optical distortion.

Step 72 involves applying the stress to the crystal 14 as needed to reduce or eliminate the thermally-induced optical distortion.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical correction system for compensating for optical distortion in an optical signal output from an optical signal generating device, the system comprising:

a beamsplitter for receiving said output signal, said beamsplitter generating a refracted beam and a reflected beam;

a sensor for receiving said refracted beam, said sensor providing a measured signal of said refracted beam;

a computational device responsive to said measured signal, said computational device receiving said measured signal and generating an actuation signal for minimizing said optical distortion, said actuation signal being representative of an error correction signal for reducing or eliminating said optical distortion;

a stress application device responsive to said actuation signal for generating a stress signal to be applied to a crystal so as to minimize said optical distortion in said reflected beam; and a force applicator in contact with at least two generally opposed faces of said crystal and responsive to said stress signal from said stress application device, said force applicator applying a force to said crystal sufficient to thus remove or eliminate said distortion from said output signal of said crystal.

2. The system of claim 1, wherein said computation device determines said actuation signal based on minimizing said optical distortion via a least squares computation.

3. The system of claim 2, wherein said computational device further determines a root means square value for said optical distortion.

4. The system of claim 1, wherein said crystal is selected from the group consisting of a trigonal symmetry, a cubic symmetry, and an isotropic symmetry.

5. The system of claim 1, wherein said stress signal may comprise a signal indicating that a stress is to be applied to said crystal.

6. The system of claim 1, wherein said stress application device comprises a piezoelectric transducer.

7. The system of claim 1, wherein said force applicator comprises a U-shaped component for applying stress to said crystal, said U-shaped component including at least two plates in contact with said at least two faces of said crystal.

8. The system of claim 1, wherein said force applicator comprises a cylindrical shaped member and said crystal comprises a cylindrical shaped crystal rod, an outer face of said crystal rod disposed within and in substantial contact with an inner face of said cylindrical shaped member.

9. The system of claim 1, wherein said force applicator is fixedly connected with said at least two generally opposed faces of said crystal, said force applicator applying one of a compressive and tensile force on said crystal.

10. The system of claim 1, wherein said force applicator applies a uniform force orthogonal to an optical axis of said crystal.

11. An optical correction system for use with an optical element, comprising:

a beamsplitter for receiving an output beam from said optical element, said beamsplitter generating a refracted beam and a reflected beam;

a computation device responsive to a measured optical distortion of said output beam for calculating an appropriate error correction signal to minimize or eliminate said measured optical distortion;

a stress application device responsive to said error correction signal for generating an electrical stress signal representative of the stress needed to be applied to an optical element in a manner to reduce or eliminate said measured optical distortion; and a force applicator responsive to said electrical stress signal for applying a stress to at least two faces of an optical element to correct for said measured optical distortion in said reflected beam, said force applicator being disposed in contact with said optical element.

12. The apparatus of claim 11, wherein said computation device uses a least squares computation to determine said error correction signal for minimizing or eliminating said optical distortion.

13. The apparatus of claim 11, further including a wavefront sensor for sensing a slope of said refracted beam and providing a measured signal indicative of optical distortion in said output beam, said wavefront sensor coupled between said beamsplitter and said computational device.

14. The apparatus of claim 11, wherein the optical element is a crystal selected from the group consisting of a trigonal symmetry, a cubic symmetry, and an isotropic symmetry class.

* * * * *

UNITED STATES PATENT AND TRADEMARK OFFICE
CERTIFICATE OF CORRECTION

PATENT NO.    : 6,437,321 B1
DATED         : August 20, 2002
INVENTOR(S)   : Greninger It is certified that error appears in the above-identified patent and that said Letters Patent is hereby corrected as shown below:

Column 1,
Line 41, following paragraphs should be inserted, just above
Summary of the Invention.:

-- It is therefore a principal object of the present invention to provide an optical correction apparatus that utilizes a stress application device which corrects thermally-included wavefront distortion in a crystal.

It is another object of the present invention to provide an optical correction apparatus that can be added to an optical system without significantly increasing the expense of the optical system and without utlizing multiple mirrors.

It is another object of the present invention to provide a method of correcting thermally-induced wavefront distortion based on the transmitted beam from a crystal and applying an adjustable stress to the crystal to correct for the wavefront distortion. --

Signed and Sealed this

Fourteenth Day of January, 2003

JAMES E. ROGAN
*Director of the United States Patent and Trademark Office*